United States Patent [19]

Foster

[11] Patent Number: 4,901,199

[45] Date of Patent: Feb. 13, 1990

[54] EXTENDED FOIL CAPACITOR WITH RADIALLY SPOKED ELECTRODES

[75] Inventor: James C. Foster, Indian Shores, Fla.

[73] Assignee: The United States of America as represented by the Department of Energy, Washington, D.C.

[21] Appl. No.: 340,822

[22] Filed: Apr. 20, 1989

[51] Int. Cl.[4] ............................................. H01G 1/14
[52] U.S. Cl. ................................................... 361/308
[58] Field of Search ..................... 29/25, 42; 361/306, 361/308, 309, 310

[56] References Cited

U.S. PATENT DOCUMENTS

| | | | |
|---|---|---|---|
| 1,599,853 | 9/1926 | Toelle | 361/308 X |
| 1,948,506 | 2/1934 | Caine | 361/308 |
| 2,087,408 | 7/1937 | Katzman | 361/306 X |
| 2,323,124 | 6/1943 | Edmundson | 361/308 |
| 2,539,332 | 1/1951 | Schneider | 361/308 |
| 2,805,372 | 9/1957 | Schneider | 361/310 X |
| 3,192,457 | 6/1965 | Crockett et al. | 361/308 |
| 3,264,534 | 8/1966 | Murphy | 361/308 X |
| 3,308,359 | 3/1967 | Hayworth et al. | 361/308 X |
| 3,513,369 | 5/1970 | England et al. | 361/308 |
| 3,539,885 | 11/1970 | England | 361/308 |
| 3,593,072 | 7/1971 | Bailey | 361/308 X |
| 4,395,747 | 7/1983 | White | 361/515 |
| 4,447,852 | 5/1984 | Clement | 361/306 |
| 4,685,027 | 8/1987 | Mouries | 361/308 |
| 4,819,115 | 4/1989 | Mitchell | 361/308 |

Primary Examiner—Donald A. Griffin
Attorney, Agent, or Firm—George H. Libman; James H. Chafin; William R. Moser

[57] ABSTRACT

An extended foil capacitor has a conductive disk electrically connected in noncrushing contact to the extended foil. A conductive paste is placed through spaces between radial spokes on the disk to electrically and mechanically connect the extended foil to the disk.

7 Claims, 1 Drawing Sheet

EXTENDED FOIL CAPACITOR WITH RADIALLY SPOKED ELECTRODES

The U.S. Government has rights in this invention pursuant to Contract No. DE-AC04-76DP00656 between the Department of Energy and General Electric Company.

BACKGROUND OF THE INVENTION

This invention relates generally to extended foil capacitors and, more specifically, to an improved end electrode for extended foil capacitors.

A capacitor is an electronic component for storing electrical energy. In a typical capacitor configuration, two large conductive surfaces are spaced apart by a thin dielectric material. While these surfaces may be planar, they are often rolled and placed in a cylindrical can to save space and provide physical protection. In order to obtain an optimal electrical connection to each rolled surface and thereby minimize internal impedance, the "extended foil" capacitor was developed. This capacitor has a capacitance section formed by convolutely rolling about a mandrel several stacked foils. This stack typically includes three electrical layers sandwiched around first and second conducting layers. One edge of one conducting layer extends from one longitudinal end of the section; the opposite edge of the other conducting layer extends from the other end. These ends are the points of electrical connection to the spaced conductive surfaces of the capacitor.

The reliable connection of external electrodes to the extended conductive ends has been an ongoing problem with extended foil capacitors.

U.S. Pat. No. 2,539,332 of W. G. Schneider discloses an extended foil capacitor having a screen electrodes mechanically held against extended ends 23 of the foil.

U.S. Pat. No. 2,805,372 of W. G. Schneider discloses an extended foil capacitor having a metal plate 25 with sharp edges on radial slots 26 to cut through wax that impregnates the capacitor section and ensure mechanical contact with extended foil 22.

U.S. Pat. No. 4,685,027 of G. Mouries discloses an extended foil capacitor with a "schooped" brass plate held in contact with the foil by pressure.

Reliability may be a problem with capacitors using physical pressure to maintain contact. If the foil moves relative to the electrode, the foil may break or internal shorts may occur. It is difficult to solder or weld electrodes to the aluminum foils often used in capacitors. Because of this difficulty, applicant had been using a conductive paste such as silver filled epoxy to bond the extended foil ends to a screen similar to that shown in the aforementioned Schneider '332 patent. The holes in the screen permit the application of the paste after the capacitor is assembled. The paste is blocked by the tightly wound dielectric layers from shorting the other conducting surface.

This construction is found to have at least two major problems. The perpendicular screen conductors do not provide a symmetrical current path from the circular foil edges, an important consideration in high current applications. And the radially outer cut ends of the screen wire form sharp projections which tend to cut through surrounding insulation under vibration.

SUMMARY OF THE INVENTION

It is an object of this invention to provide an extended foil capacitor with an electrode which permits radial current flow and allows even distribution of conductive paste.

It is another object of the invention to provide an extended foil capacitor with an electrode without sharp edges.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the purpose invention, as embodied and broadly described herein, the present invention may comprise an extended foil capacitor comprising a convolutely wound cylindrical capacitance section and first and second electrodes for electrical connection, respectively, to the extended edges of the capacitance section, and each of the electrodes comprises a conductive sheet having a disk-shaped planar side facing an extended edge, the sheet having a plurality of radial spokes extending from an inner rim to an outer rim aligned approximately with the outer surface of said capacitance section, and a radial hole between each pair of adjacent spokes. The sheets are mounted so that they do not crush their respective extended edges. The holes are sized so conductive paste pushed through the holes will evenly distribute over the extended edges.

BRIEF DESCRIPTION OF THE DRAWINGS

The accompanying drawing, which is incorporated in and forms part of the specification, illustrates an embodiment of the present invention and, together with the description, serves to explain the principles of the invention.

DETAILED DESCRIPTION OF THE INVENTION

Figures 1A, 1B:
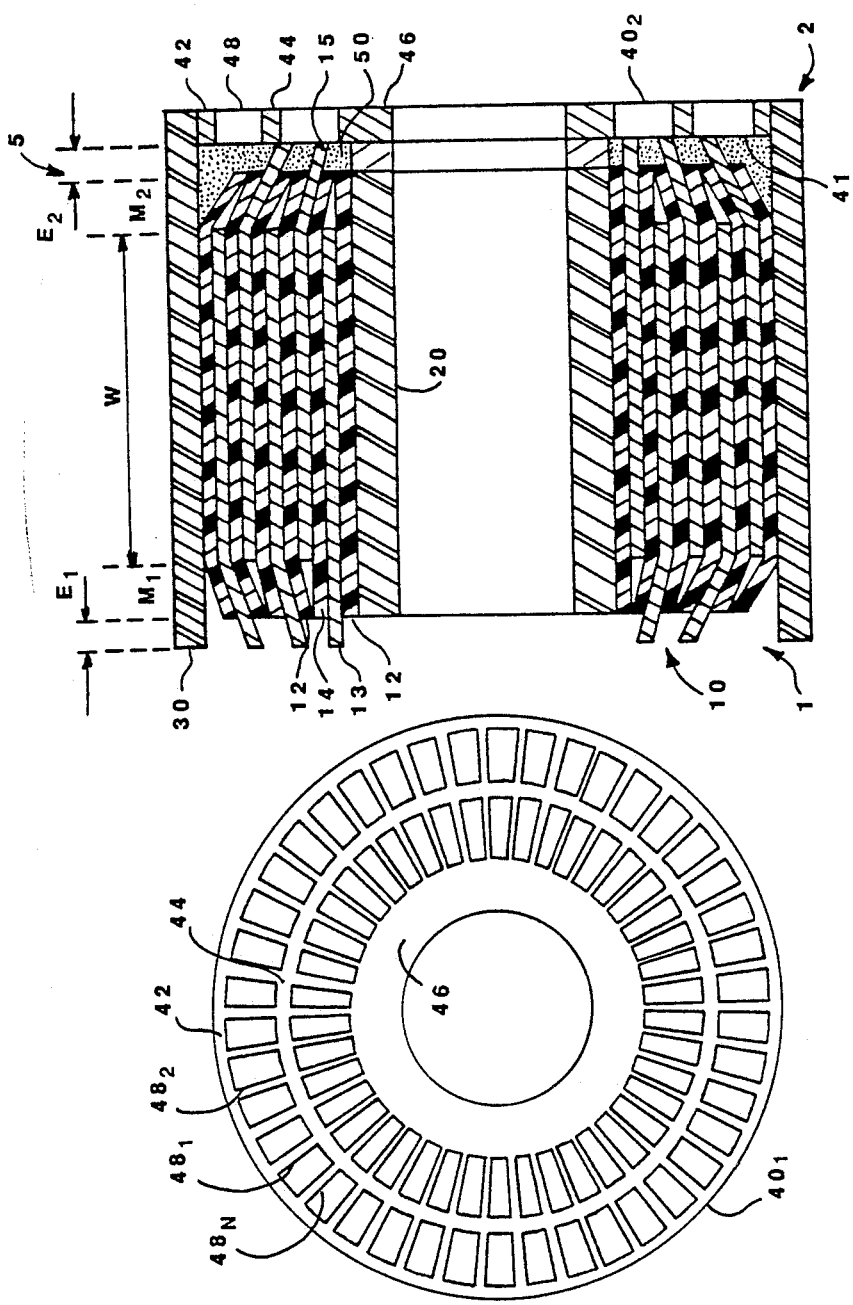
FIG. 1A shows an end view of an electrode of this invention.
FIG. 1B shows a sectional view of a capacitor utilizing the electrode of this invention.

A high current capacitor 5 in accordance with this invention is shown in FIG. 1B to include an extended foil capacitance section 10 convolutely wound about mandrel 20. Electrical contact with capacitor 5 is taken across opposed ends 1 and 2 as discussed hereinafter.

Extended foil capacitor section 10 is typically manufactured by winding a plurality of strips of material convolutely around a mandrel. The resulting structure is multiple sets of overlapping layers, each set including a first electrically insulating layer 12, a first electrically conductive foil 13, a second insulating layer 14, and a second conductive foil 15. In the context of this disclosure, a layer or foil means the wound conductive strip which defines multiple, radially spaced, turns about the longitudinal axis of the capacitor.

An extended foil capacitor has one edge of first conductive foil 13 extending longitudinally a distance $E_1$ from one edge of dielectric layers 12, 14, while second conductive foil 15 has a second edge extending longitudinally a distance $E_2$ in the opposite direction from the other edge of dielectric layers 12, 14. To get this structure, the longitudinal placement of the foils is staggered. The exposed edges of each conducting foil define an electrical contact for the capacitor. The opposite edge of each foil is sandwiched by a margin $M_1$ or $M_2$ by adjacent layers 12, 14 to prevent a short circuit with the other foil. The construction of extended foil capacitance section 10 is well known in the capacitor art. The invention is directed to the structure used to make electrical contact with the extended foil ends.

To provide a rigid, reliable connection to each extension, capacitance section 30 is surrounded by a dielectric canister 10. This conducting disks $40_1$, $40_2$ are held by canister 30 with a planar side 41 in noncrushing crushing contact with the tips of extended foils 13, 15. Noncrushing contact means the extended foils ends are not mashed down against the edges of the dielectric layers; rather, the foil ends remain substantially extended with a space between adjacent foil layers, the dielectric edges and planar side 41 of disks $40_1$, $40_2$.

In order to make electrical contact with the extended foil ends, the aforementioned space under each disk is filled with an electrically conductive epoxy 50 put through holes in each disk after the disks have been mounted against their respective foil ends.

DIsk $40_1$ is shown in FIG. 1A removed and rotated 90° from capacitor 5 of FIG. 1B. Each disk is constructed in accordance with this invention with a plurality of radial spokes, $48_1$, $48_2$, ... $48_N$, evenly spaced around the disk and extending from an inner rim 46 to an outer rim 42. An external connection, not shown, may conventionally be connected to inner rim 46. The spokes may pass through a mid rim 44 for additional stability. These spokes provide excellent current handling properties as current from any point on a foil end is conducted toward inner rim 46 in a relatively straight line down the nearest spoke to the point. In particular, for a prior art screen-type disk, current from a point near outer rim 42 must travel in a series of short steps toward inner rim 46. The smooth current path of the spokes ensures a lower impedance for the invention, an important consideration when large currents are being rapidly discharged from capacitance section 10.

Disks $40_1$, $40_2$ are preferably cut or etched from 0.5 mm (20 mil) sheet of oxygen free, high conductivity (OFHC) copper. The method of manufacture is not important; however, it is important that the finished disk not have any sharp edges that might cause damage if the disk moves relative to the foil or canister 30 due to vibration.

The holes between radial spokes 48 must be sized to permit efficient application of conductive paste over the entire adjacent extended foil. In a preferred embodiment, radial spokes 48 are each an identical, constant, width over their entire length. The width of each spoke is selected so that the sum of the width of all spokes forms less than 20% of the circumference of outer rim 42, and less than 50% of inner rim 46.

One embodiment of capacitor built in accordance with this invention was formed of 80 to 100 turns of a 6.5 cm (2 9/16″) wide sandwich of a first insulator layer, a first foil, second and third insulator layers, a second foil, and a fourth insulator layer. Each aluminum foil had a thickness of 0.20 mils (0.0002″) and each polyester insulator layer had a thickness of 0.00048″. Each foil had an extension, E, of 2 mm (1/16″) and a margin, M, of 5 mm (3/16″). Each OFHC copper disk $40_1$, $40_2$ was constructed with 60 spokes of 0.5 mm (0.020″) width, the centerline of each spoke being spaced 6° from each adjacent spoke. The diameter of outer rim 42 was 6.6 cm (2.6″), mid rim 44 was 4.8 cm (1.9″), and inner rim 46 was 2.5 cm (1″). A standard conductive epoxy was placed through the disk holes to fill the space under each disk. The 3 uF capacitor easily transfers a 45 KA current pulse from capacitance section 10 to an external load connected across inner rim 46 of each disk.

The particular sizes and equipment discussed above are cited merely to illustrate a particular embodiment of this invention. It is contemplated that the use of the invention may involve components having different sizes and shapes as long as the principle, using a copper disk without sharp edges to contact, without crushing, the ends of the extended foils, is followed. It is intended that the scope of the invention be defined by the claims appended hereto.

I claim:

1. An extended foil capacitor comprising:
   a convolutely wound cylindrical capacitance section comprising first and second electrically conducting foils separated by dielectric layers;
   one edge of a first conducting foil extending longitudinally beyond one edge of each of said dielectric layers, the other edge of each of said dielectric layers extending longitudinally beyond the other edge of said first conducting foil;
   the one edge of each of said dielectric layers extending longitudinally beyond one edge of a second conducting foil, the other edge of said second conducting foil extending longitudinally beyond the other edge of each of said dielectric layers,;
   first and second electrodes for electrical connection, respectively, to said one edge of said first conducting foil and said other edge of said second conducting foil, wherein each of said electrodes comprises:
   a conductive sheet having a disk-shaped planar side, said sheet having:
   a plurality of radial spokes extending from an inner rim to an outer rim aligned approximately with the outer surface of said capacitance section; and
   a radial hole between each pair of adjacent spokes; and
   mounting means for holding said planar side in noncrushing contact with said extended edge.

2. The capacitor of claim 1, further comprising a conductive paste extending from each said sheet to the adjacent edge of said dielectric layers of said capacitance section, whereby said paste is applied to said capacitor through the holes.

3. The capacitor of claim 2 wherein each spoke is a constant width along its length.

4. The capacitor of claim 3 wherein said plurality of spokes is evenly distributed around said sheet, the sum of the width of all spokes being less than 20% of the diameter of the outer rim.

5. The capacitor of claim 4 wherein said inner rim is aligned approximately with the inner surface of said capacitance section, the sum of the width of all spokes being less than 50% of the diameter of the inner rim.

6. The capacitor of claim 5 wherein the said conductive sheet has about 60 spokes.

7. The capacitor of claim 2 wherein said disk is oxygen free high conductivity copper.

* * * * *